US010816138B2

(12) United States Patent
Zhao et al.

(10) Patent No.: US 10,816,138 B2
(45) Date of Patent: Oct. 27, 2020

(54) MANUFACTURE OF A CONFORMABLE PRESSURE VESSEL

(71) Applicant: Goodrich Corporation, Charlotte, NC (US)

(72) Inventors: Wenping Zhao, Glastonbury, CT (US); Ellen Y. Sun, South Windsor, CT (US)

(73) Assignee: Goodrich Corporation, Charlotte, NC (US)

( * ) Notice: Subject to any disclaimer, the term of this patent is extended or adjusted under 35 U.S.C. 154(b) by 311 days.

(21) Appl. No.: 15/706,117

(22) Filed: Sep. 15, 2017

(65) Prior Publication Data
US 2019/0086030 A1    Mar. 21, 2019

(51) Int. Cl.
F17C 1/08        (2006.01)
B29C 69/00       (2006.01)
(Continued)

(52) U.S. Cl.
CPC .............. *F17C 1/08* (2013.01); *B23K 20/122* (2013.01); *B23K 20/129* (2013.01); *B23K 20/22* (2013.01); *B29C 69/007* (2013.01); *B29C 70/10* (2013.01); *B29C 70/42* (2013.01); *B29D 22/00* (2013.01); *F17C 1/14* (2013.01); *F17C 1/16* (2013.01); *B23K 2101/12* (2018.08); *B23K 2103/00* (2018.08); *B23K 2103/16* (2018.08); *B23K 2103/42* (2018.08); *B29L 2031/7172* (2013.01);
(Continued)

(58) Field of Classification Search
CPC . B23K 2101/12; B29C 69/007; B29C 69/004; B29C 69/00; F17C 1/08
See application file for complete search history.

(56) References Cited

U.S. PATENT DOCUMENTS 1,640,471 A    8/1927   Staley
2,461,096 A    2/1949   Wagner
(Continued)

FOREIGN PATENT DOCUMENTS

CN    103538817 A    1/2014
DE      3206430 A1   9/1983
(Continued)

OTHER PUBLICATIONS

Extended European Search Report for European Patent Application No. 18194813.4 dated Mar. 8, 2019, 12 pages.
(Continued)

*Primary Examiner* — Philip C Tucker
*Assistant Examiner* — Jimmy R Smith, Jr.
(74) *Attorney, Agent, or Firm* — Kinney & Lange, P.A.

(57) ABSTRACT

A method of manufacturing a high-pressure fluid vessel includes forming a first portion of a high-pressure fluid vessel with a molding process. The high-pressure fluid vessel includes a stack of capsules. Each capsule includes a first domed end, a second domed end, and a semicylindrical portion extending between and connecting the first domed end to the second domed end. The method further includes forming a second portion of a high-pressure fluid vessel with the molding process. The second portion of the high-pressure fluid vessel is positioned adjacent to the first portion of the high-pressure fluid vessel. The second portion of the high-pressure fluid vessel is welded to the first portion of the high-pressure fluid vessel.

7 Claims, 10 Drawing Sheets

(51) Int. Cl.
  B29D 22/00 (2006.01)
  B29C 70/42 (2006.01)
  B29C 70/10 (2006.01)
  F17C 1/16 (2006.01)
  B23K 20/22 (2006.01)
  F17C 1/14 (2006.01)
  B23K 20/12 (2006.01)
  B29L 31/00 (2006.01)
  B23K 103/00 (2006.01)
  B23K 101/12 (2006.01)
  B23K 103/16 (2006.01)

(52) U.S. Cl.
  CPC .......... F17C 2201/0147 (2013.01); F17C 2203/0604 (2013.01); F17C 2203/066 (2013.01); F17C 2203/0619 (2013.01); F17C 2203/0624 (2013.01); F17C 2203/0636 (2013.01); F17C 2203/0673 (2013.01); F17C 2205/0302 (2013.01); F17C 2209/2118 (2013.01); F17C 2209/2127 (2013.01); F17C 2209/2145 (2013.01); F17C 2209/232 (2013.01); F17C 2221/033 (2013.01); F17C 2260/018 (2013.01)

(56) References Cited

U.S. PATENT DOCUMENTS

| | | |
|---|---|---|
| 2,516,100 A | 7/1950 | Boardman |
| 2,533,431 A | 12/1950 | Chausson |
| 2,552,119 A | 5/1951 | Scharenberg |
| 2,634,019 A | 4/1953 | Pfaff |
| 2,672,254 A | 3/1954 | Boardman |
| 2,947,439 A | 8/1960 | McGrath |
| 3,288,186 A | 11/1966 | Headrick |
| 3,314,567 A | 4/1967 | Becker et al. |
| 3,447,768 A | 6/1969 | McQueen |
| 3,931,907 A | 1/1976 | Henle |
| 4,287,913 A | 9/1981 | Bennett et al. |
| 4,432,515 A | 2/1984 | Jarvineva |
| 4,858,778 A | 8/1989 | Patrick |
| 4,941,583 A | 7/1990 | Gerhard |
| 4,946,056 A | 8/1990 | Stannard |
| 5,042,751 A | 8/1991 | Kolom |
| 5,071,166 A | 12/1991 | Marino |
| 5,083,727 A | 1/1992 | Pompei et al. |
| 5,085,343 A | 2/1992 | Scarr |
| 5,103,996 A | 4/1992 | McGarvey |
| 5,303,739 A | 4/1994 | Ellgoth et al. |
| 5,310,080 A | 5/1994 | Figge, Sr. |
| 5,367,879 A | 11/1994 | Doke et al. |
| 5,383,566 A | 1/1995 | Johnson |
| 5,389,839 A | 3/1995 | Kleyn |
| 5,476,189 A | 12/1995 | Duvall et al. |
| 5,620,111 A | 4/1997 | Gehman |
| 5,647,503 A | 7/1997 | Steele et al. |
| 5,651,474 A | 7/1997 | Callaghan et al. |
| 5,697,511 A | 12/1997 | Bampton |
| 5,758,796 A | 6/1998 | Nishimura et al. |
| 5,779,092 A | 7/1998 | Hehn et al. |
| 5,845,879 A | 12/1998 | Jensen |
| 5,848,720 A | 12/1998 | Logan |
| 5,927,651 A | 7/1999 | Geders et al. |
| 5,936,861 A | 8/1999 | Jang et al. |
| 5,944,215 A | 8/1999 | Orlowski |
| 6,044,999 A | 4/2000 | Kido |
| 6,090,465 A | 7/2000 | Steele et al. |
| 6,422,514 B1 | 7/2002 | Clark et al. |
| 6,668,561 B1 | 12/2003 | Sheu et al. |
| 6,691,889 B1 | 2/2004 | Falk |
| 6,837,464 B1 | 1/2005 | Kirn et al. |
| 7,195,133 B1 | 3/2007 | Cundiff et al. |
| 7,396,459 B2 | 7/2008 | Thorpe |
| 7,803,241 B2 | 9/2010 | Cundiff et al. |
| 7,810,670 B2 | 10/2010 | Carter et al. |
| 8,192,666 B2 | 6/2012 | Strack et al. |
| 8,235,242 B2 | 8/2012 | Ha |
| 8,794,476 B2 | 8/2014 | Hausberger et al. |
| 8,917,809 B2 | 12/2014 | Nozawa |
| 8,939,407 B2 | 1/2015 | Robinson et al. |
| 9,126,365 B1 | 9/2015 | Mark et al. |
| 9,243,751 B2 | 1/2016 | Clark et al. |
| 9,458,955 B2 | 10/2016 | Hammer et al. |
| 9,470,366 B2 | 10/2016 | Dullaert et al. |
| 9,476,546 B2 | 10/2016 | Croteau et al. |
| 9,523,466 B2 | 12/2016 | Nishimoto et al. |
| 10,081,129 B1 | 9/2018 | Alvarado et al. |
| 10,099,427 B2 | 10/2018 | Mark et al. |
| 2002/0179610 A1 | 12/2002 | Franklin, III et al. |
| 2003/0044593 A1 | 3/2003 | Vaidyanathan et al. |
| 2004/0159663 A1 | 8/2004 | Fenton |
| 2004/0173618 A1 | 9/2004 | Suzuki et al. |
| 2004/0178205 A1 | 9/2004 | Balzer et al. |
| 2005/0129889 A1 | 6/2005 | Davis et al. |
| 2007/0158343 A1* | 7/2007 | Shimada ............... F17C 1/06 220/4.14 |
| 2007/0289451 A1 | 12/2007 | Rice |
| 2008/0110900 A1 | 5/2008 | Veenehdaal |
| 2009/0174709 A1 | 7/2009 | Kozlak et al. |
| 2009/0314785 A1 | 12/2009 | Cronin et al. |
| 2010/0084030 A1 | 4/2010 | Mackulin et al. |
| 2010/0116778 A1 | 5/2010 | Melrose |
| 2011/0168728 A1 | 7/2011 | McDermott et al. |
| 2012/0217249 A1 | 8/2012 | Baika et al. |
| 2013/0048646 A1 | 2/2013 | Kataoka et al. |
| 2013/0213973 A1 | 8/2013 | Esser |
| 2014/0291331 A1 | 10/2014 | Morales et al. |
| 2014/0328964 A1 | 11/2014 | Mark et al. |
| 2015/0258740 A1 | 9/2015 | Kang et al. |
| 2016/0061381 A1 | 3/2016 | Kotliar |
| 2016/0068235 A1 | 3/2016 | Ohtsuka et al. |
| 2016/0070254 A1 | 3/2016 | Hovsepian et al. |
| 2016/0161057 A1 | 6/2016 | Kang et al. |
| 2016/0238193 A1 | 8/2016 | Meyer |
| 2016/0257403 A1 | 9/2016 | Masuda |
| 2016/0263832 A1 | 9/2016 | Bui et al. |
| 2016/0272413 A1 | 9/2016 | Masuda |
| 2016/0281926 A1 | 9/2016 | Croteau et al. |
| 2016/0290564 A1* | 10/2016 | Croteau ............... F17C 13/06 |
| 2016/0341359 A1 | 11/2016 | Nishibu |
| 2016/0361869 A1 | 12/2016 | Mark et al. |
| 2017/0268206 A1 | 9/2017 | Giamati |
| 2018/0126667 A1 | 5/2018 | Wilenski et al. |
| 2019/0061947 A1 | 2/2019 | Slane et al. |
| 2019/0061948 A1 | 2/2019 | Ching et al. |
| 2019/0061986 A1 | 2/2019 | Slane et al. |

FOREIGN PATENT DOCUMENTS

| | | |
|---|---|---|
| DE | 102007018549 A1 | 10/2008 |
| DE | 102011101471 A1 | 11/2012 |
| EP | 1409917 B1 | 6/2006 |
| EP | 2392395 A1 | 12/2011 |
| EP | 2942285 A1 | 11/2015 |
| EP | 3015721 A1 | 5/2016 |
| EP | 3061709 A1 | 8/2016 |
| EP | 3073174 A1 | 9/2016 |
| FR | 2218529 A1 | 9/1974 |
| GB | 1426414 | 2/1976 |
| JP | 2005155776 A | 6/2005 |
| KR | 20100113865 A | 10/2010 |
| KR | 20100113865 A * | 10/2010 |
| WO | WO2016057024 A1 | 4/2016 |
| WO | WO2017091222 A1 | 6/2017 |

OTHER PUBLICATIONS

Extended European Search Report for European Patent Application No. 18190532.4, dated Jan. 25, 2019, 7 pages.

Extended European Search Report for European Patent Application No. 18190579.5, dated Jan. 29, 2019, 10 pages.

(56) References Cited

OTHER PUBLICATIONS

Extended European Search Report for European Patent Application No. 18191294.0, dated Jan. 31, 2019, 5 pages.
Extended European Search Report for European Patent Application No. 18193814.3, dated Feb. 12, 2019, 8 pages.
Extended European Search Report for European Patent Application No. 18194813.4, dated Jun. 26, 2019, 11 pages.
European Office Action dated Mar. 13, 2020, received for corresponding European Application No. 18190579.5, 4 pages.
European Office Action dated Nov. 8, 2019, received for corresponding European Application No. 18190532.4, 4 pages.

* cited by examiner

MANUFACTURE OF A CONFORMABLE PRESSURE VESSEL

BACKGROUND

The present disclosure relates to high-pressure fluid vessels. More specifically, the present disclosure relates to high-pressure fluid vessels for use in aircraft potable water systems.

Aircraft potable water systems supply drinkable water throughout an aircraft for various uses. Aircraft potable water systems typically include many parts, including but not limited to: fluid vessels, hydraulic pumps, fluid heaters, control valves, and hydraulic fluid line tubing. The fluid vessels used for aircraft potable water vessels are generally pressurized and must maintain their shape while under internal pressure. The preferred shape for high-pressure fluid vessels is a cylindrical or spherical shape because there are few corners, reducing the number of stress concentration locations.

With that said, high-pressure fluid vessels for aircraft potable water systems must fit into a limited space, shape, and size that significantly deviates from the cylindrical or spherical shape preferred by pressurized vessels. Further, as with any other aircraft components, the high-pressure fluid vessel must be lightweight to meet aircraft weight restrictions. These requirements present significant design and manufacturing challenges for high-pressure vessels in aircraft potable water systems.

SUMMARY

A method of manufacturing a high-pressure fluid vessel includes forming a first portion of a high-pressure fluid vessel with a molding process. The high-pressure fluid vessel includes a stack of capsules. Each capsule includes a first domed end, a second domed end, and a semicylindrical portion extending between and connecting the first domed end to the second domed end. The method further includes forming a second portion of a high-pressure fluid vessel with the molding process. The second portion of the high-pressure fluid vessel is positioned adjacent to the first portion of the high-pressure fluid vessel. The second portion of the high-pressure fluid vessel is welded to the first portion of the high-pressure fluid vessel.

A method of manufacturing a high-pressure fluid vessel includes forming a plurality of liners with a molding process. A first composite material is wrapped around each of the liners to form a plurality of compartments. An aperture is formed in each of the plurality of compartments. The plurality of compartments are positioned adjacent to one another. A second composite material is wrapped around the plurality of compartments to form a high-pressure fluid vessel.

DETAILED DESCRIPTION

Figure 1A:
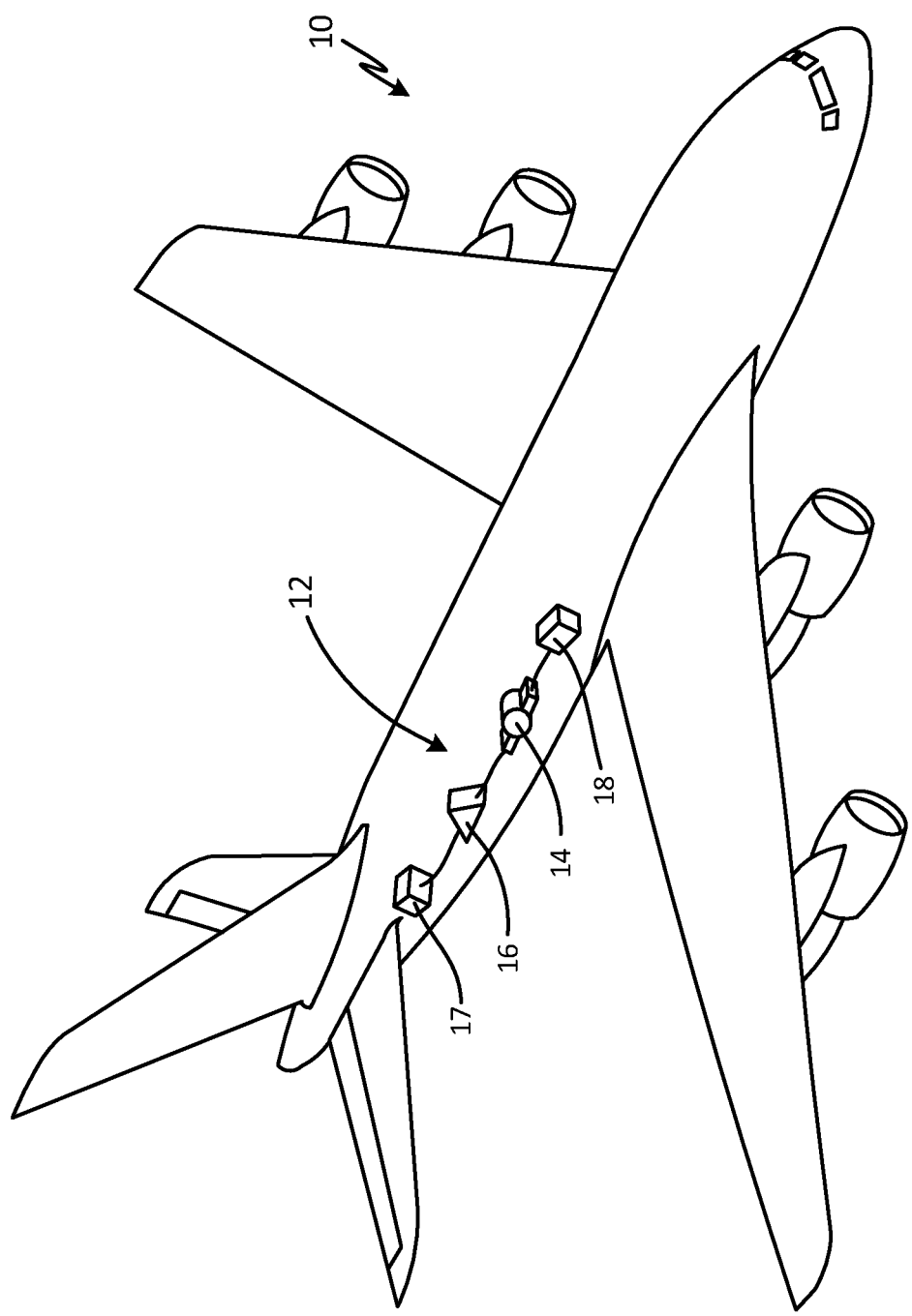
FIG. 1A is a schematic of an aircraft with a potable water system.
Figure 1B:
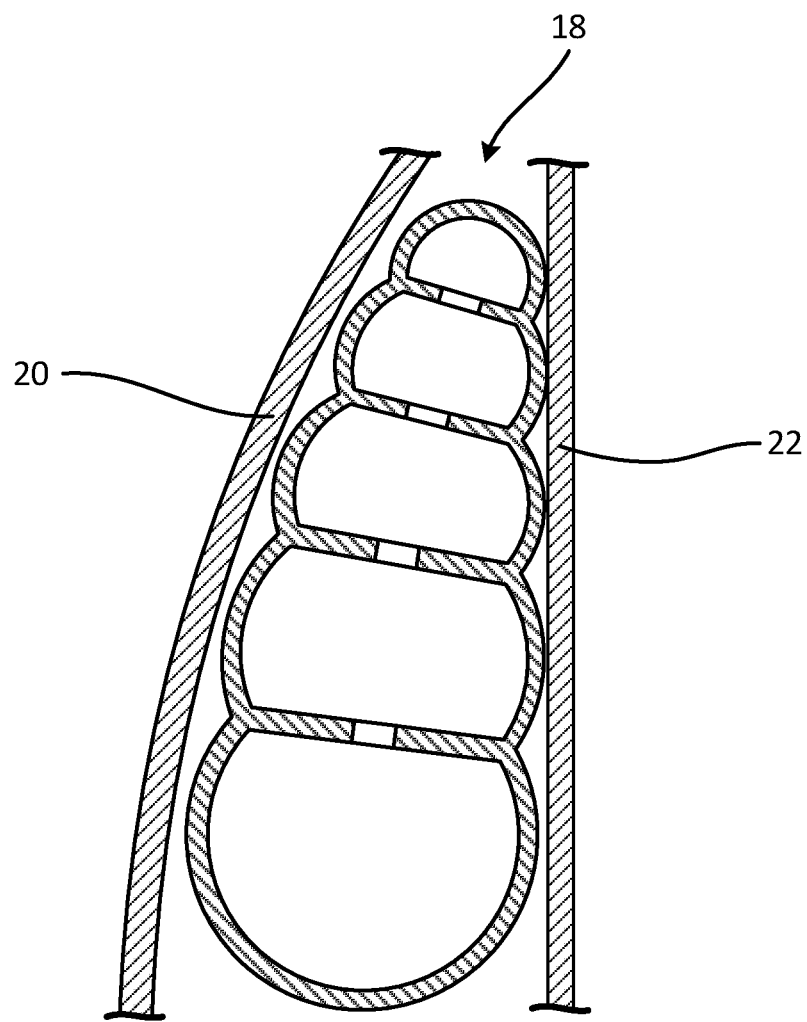
FIG. 1B is a cross-sectional view of an aircraft fuselage, showing a first embodiment of a high-pressure fluid vessel.

FIG. 1A is a schematic of aircraft 10 with potable water system 12, which includes hydraulic pump 14, control valve 16, point of use 17, and high-pressure fluid vessel 18. FIG. 1B is a cross-sectional view of aircraft 10, showing conformable tank 18, external fuselage structure 20, and internal aircraft structure 22.

Potable water system 12 is situated in an aft portion of aircraft 10. Within potable water system 12, hydraulic tubes, lines, or hoses connect hydraulic pump 14, control valve 16, point of use 17, and high-pressure fluid vessel 18. Fluid flow within potable water system 12 is induced by hydraulic pump 14. Control of the fluid flow within potable water system 12 is achieved by utilizing control valve 16. Potable water, for use in potable water system 12, is stored at an elevated pressure within high-pressure fluid vessel 18, as compared to ambient pressure outside high-pressure fluid vessel 18.

As shown in FIG. 1B, high-pressure fluid vessel 18 is configured to conform to both external fuselage structure 20 and internal aircraft structure 22. The portion of high-pressure fluid vessel 18 closest to external fuselage structure 20 is curved to conform to the curvature of external fuselage structure 20. Likewise, the portion of high-pressure fluid vessel 18 closest to internal aircraft structure 22 is more or less flat to conform to internal aircraft structure 22. FIG. 1B shows one embodiment of conformable high-pressure fluid vessel 18 and is not meant to limit the disclosure to a single embodiment. High-pressure fluid vessel 18 is conformable for use in a plurality of irregular aircraft spaces.

Figure 2A:
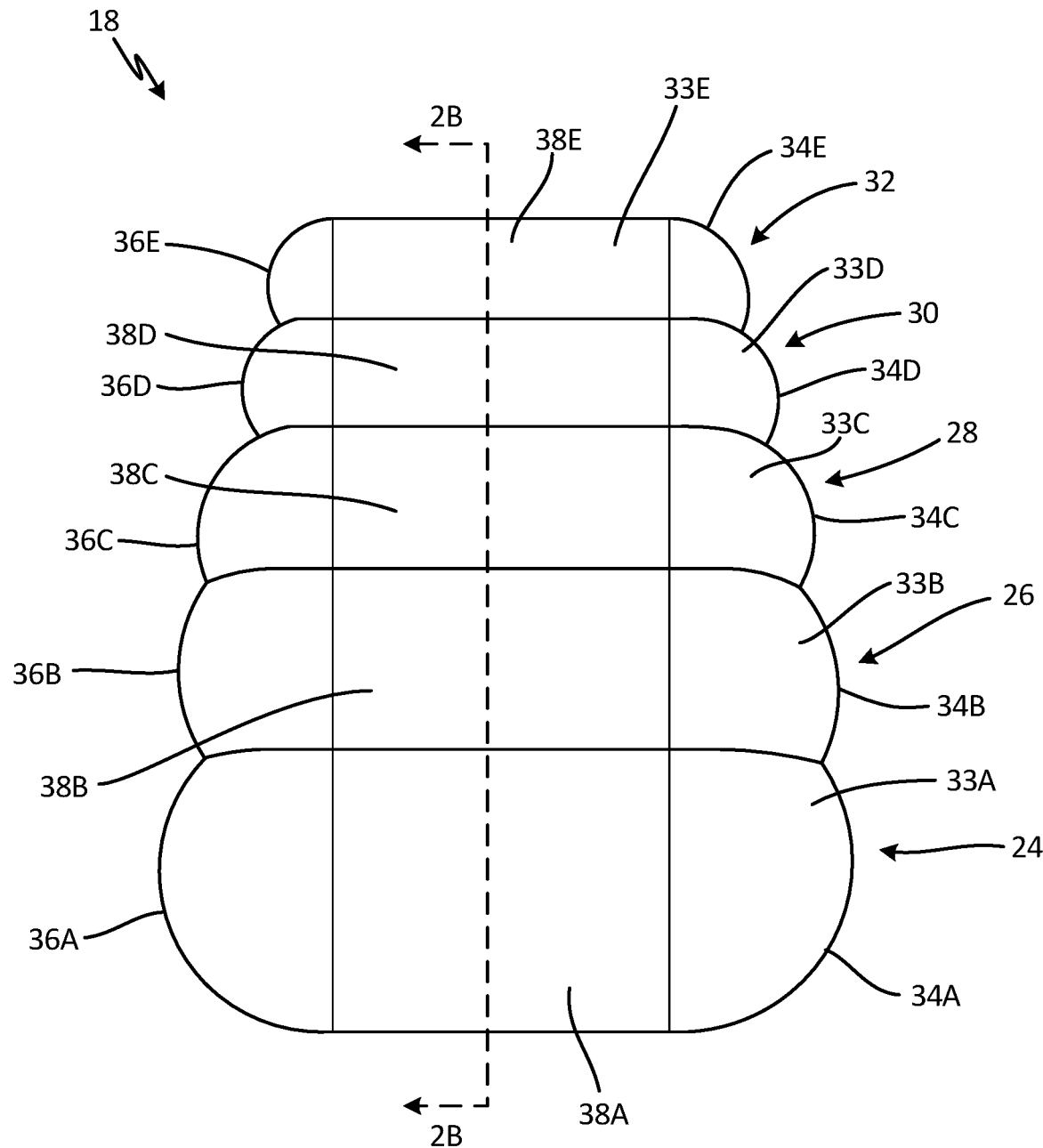
FIG. 2A is a front view of the high-pressure fluid vessel of FIG. 1B.
Figure 2B:
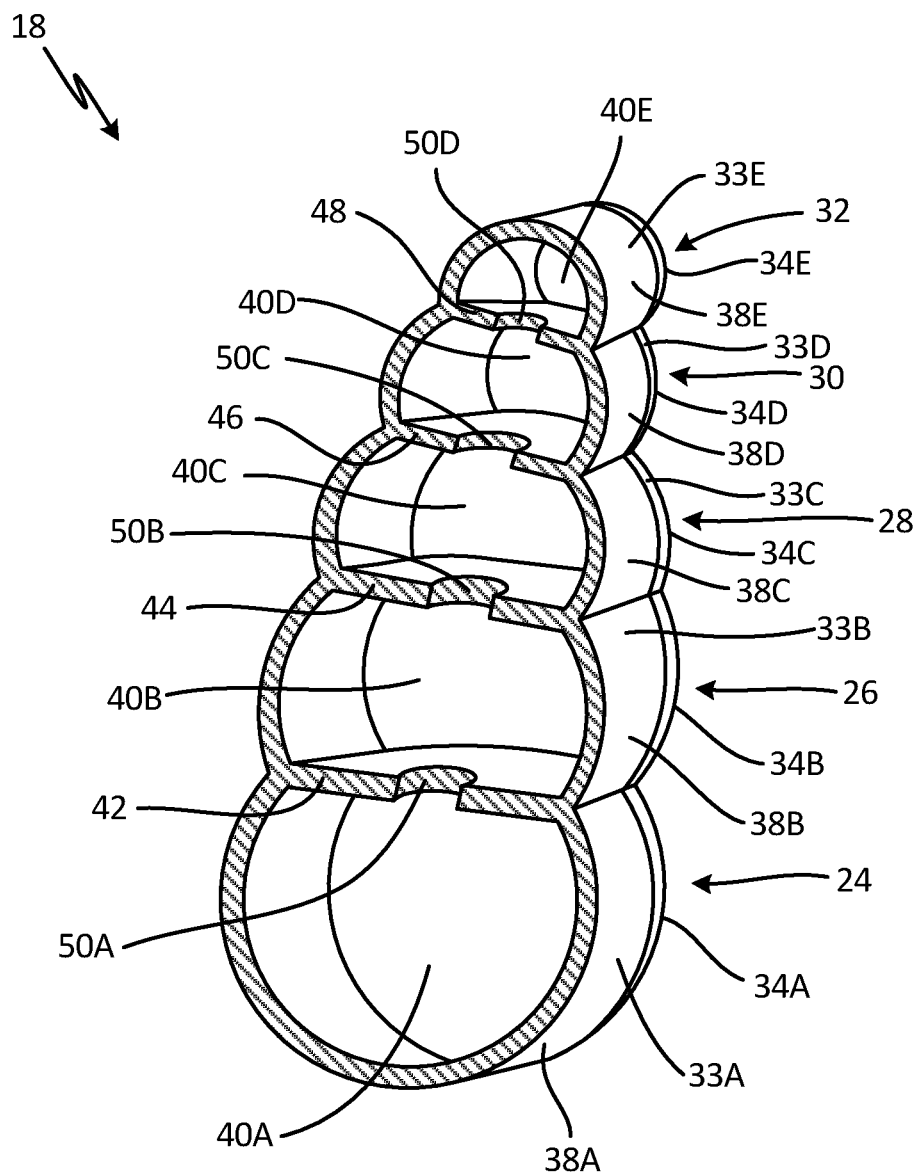
FIG. 2B is a perspective cross-sectional view of the high-pressure fluid vessel taken along line 2B-2B of FIG. 2A.

FIG. 2A is a front view of high-pressure fluid vessel 18. FIG. 2B is a perspective cross-sectional view of high-pressure fluid vessel 18 taken along line 2B-2B of FIG. 2A. High-pressure fluid vessel 18 includes bottom compartment 24, intermediate compartments 26, 28, and 30, and top compartment 32. Bottom compartment 24 includes capsule 33A with first domed end 34A, second domed end 36A (shown in FIG. 2A), semicylindrical portion 38A, and cavity 40A (shown in FIG. 2B). Intermediate compartment 26 includes capsule 33B with first domed end 34B, second domed end 36B (shown in FIG. 2A), semicylindrical portion 38B, and cavity 40B (shown in FIG. 2B). Intermediate compartment 28 includes capsule 33C with first domed end 34C, second domed end 36C (shown in FIG. 2A), semicylindrical portion 38C, and cavity 40C (shown in FIG. 2B). Intermediate compartment 30 includes capsule 33D with first domed end 34D, second domed end 36D (shown in FIG. 2A), semicylindrical portion 38D, and cavity 40D (shown in FIG. 2B). Top compartment 32 includes capsule 33E with first domed end 34E, second domed end 36E (shown in FIG. 2B), semicylindrical portion 38E, and cavity 40E (shown in FIG. 2B). High-pressure fluid vessel 18 further includes internal supports 42, 44, 46, and 48 (shown in FIG. 2B). Internal support 42 includes apertures 50A (shown in FIG. 2B). Internal support 44 includes aperture 50B (shown in FIG. 2B). Internal support 46 includes aperture 50C (shown in FIG. 2B). Internal support 48 includes aperture 50D (shown in FIG. 2B).

Located at the base of high-pressure fluid vessel 18 is bottom compartment 24, which is located below and connected to intermediate compartment 26. Intermediate compartment 26 is located below and connected to intermediate compartment 28. Intermediate compartment 28 is located below and connected to intermediate compartment 30. Intermediate compartment 30 is located below and connected to top compartment 32. In the embodiment shown, high-pressure fluid vessel 18 has three intermediate compartments 26, 28, and 30. In an alternate embodiment, high pressure fluid vessel 18 can include any number of intermediate compartments or no intermediate compartments.

Capsules 33A, 33B, 33C, 33D, and 33E are convex curved shaped body portions of bottom compartment 24, intermediate compartments 26, 28, and 30, and top compartment 32, respectively. Capsule 33A of bottom compartment 24 includes first domed end 34A, second domed end 36A, and semicylindrical portion 38A extending between and connecting first domed end 34A and second domed end 36A. Cavity 40A is positioned in bottom compartment 24 and is defined by capsule 33A. Capsule 33B of intermediate compartment 26 comprises first domed end 34B, second domed end 36B, and semicylindrical portion 38B extending between and connecting first domed end 34B and second domed end 36B. Cavity 40B is positioned in intermediate compartment 26 and is defined by capsule 33B. Capsule 33C of intermediate compartment 28 includes first domed end 34C, second domed end 36C, and semicylindrical portion 38C extending between and connecting first domed end 34C and second domed end 36C. Cavity 40C is positioned in intermediate compartment 28 and is defined by capsule 33C. Capsule 33D of intermediate compartment 30 includes first domed end 34D, second domed end 36D, and semicylindrical portion 38D extending between and connecting first domed end 34D and second domed end 36D. Cavity 40D is positioned in intermediate compartment 30 and is defined by capsule 33D. Capsule 33E of top compartment 32 includes first domed end 34E, second domed end 36E, and semicylindrical portion 38E extending between and connecting first domed end 34E and second domed end 36E. Cavity 40E is positioned in top compartment 32 and is defined by capsule 33E.

First domed ends 34A, 34B, 34C, 34D, and 34E and second domed ends 36A, 36B, 36C, 36D, and 36E are semispherical shaped. Semicylindrical portions 38A, 38B, 38C, 38D, and 38E are right circular cylindrical shaped where a cross-section of the semicylindrical portions 38A, 38B, 38C, 38D, and 38E are circular shaped.

Internal supports 42, 44, 46, and 48 are positioned in high-pressure fluid vessel 18 to provide structural support for high-pressure fluid vessel 18. Internal supports 42, 44, 46, and 48 are baffles in the embodiment shown in FIGS. 2A-2B. Internal support 42 is positioned between bottom compartment 24 and intermediate compartment 26. Internal support 44 is positioned between intermediate compartment 26 and intermediate compartment 28. Internal support 46 is positioned between intermediate compartment 28 and intermediate compartment 30. Internal support 48 is positioned between intermediate compartment 30 and top compartment 32.

Aperture 50A extends through internal support 42 to connect bottom compartment 24 to intermediate compartment 26. Aperture 50B extends through internal support 44 to connect intermediate compartment 26 to intermediate compartment 28. Aperture 50C extends through internal support 46 to connect intermediate compartment 28 to intermediate compartment 30. Aperture 50D extends through internal support 48 to connect intermediate compartment 30 to top compartment 32. In alternate embodiments, internal supports 42, 44, 46, and 48 can include one or more apertures 50A, 50B, 50C, and 50D, each aperture being of equal or varying size.

High-pressure fluid vessel 18 is capable of holding potable water on aircraft 10. High-pressure fluid vessel 18 includes bottom compartment 24, intermediate compartments 26, 28, and 30, and top compartment 32 that are designed to conform to aircraft 10. High-pressure fluid vessel 18 includes internal supports 42, 44, 46, and 48 to provide structural support to high-pressure fluid vessel 18 to prevent high-pressure fluid vessel 18 from deforming under pressure. Apertures 50A, 50B, 50C, and 50D extend through internal supports 42, 44, 46, and 48 respectively, to allow potable water to flow through high-pressure fluid vessel 18.

Figure 3:
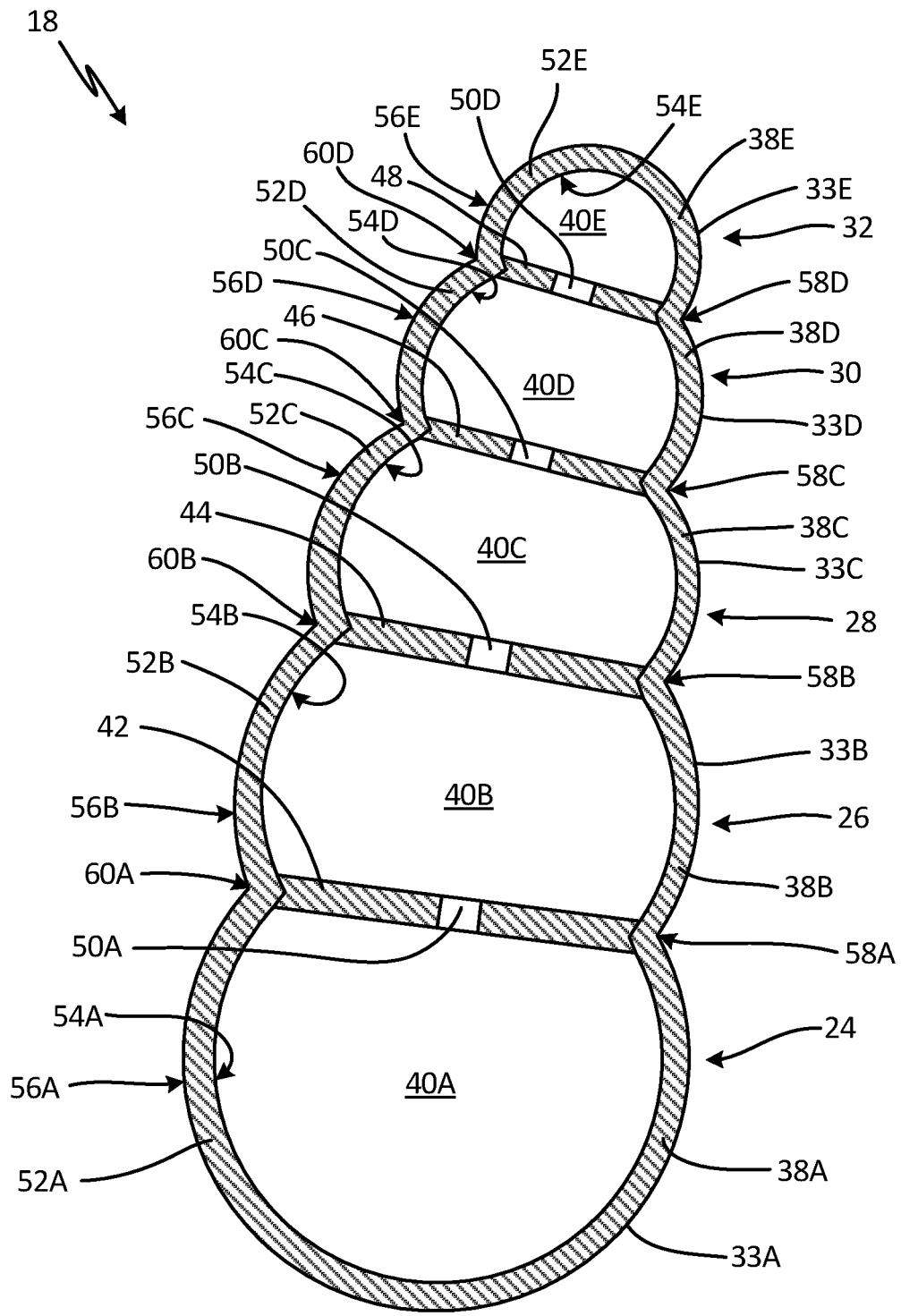
FIG. 3 is a side cross-sectional view of the high-pressure fluid vessel of FIG. 2A.

FIG. 3 is a side cross-sectional view of high-pressure fluid vessel 18. High-pressure fluid vessel 18 includes bottom compartment 24, intermediate compartments 26, 28, and 30, and top compartment 32 with capsules 33A, 33B, 33C, 33D, and 33E having first domed ends 34A, 34B, 34C, 34D, and 34E (shown in FIGS. 2A-2B), second domed ends 36A, 36B, 36C, 36D, and 36E (shown in FIG. 2A), semicylindrical portions 38A, 38B, 38C, 38D, and 38E, and cavities 40A, 40B, 40C, 40D, and 40E, respectively. High-pressure fluid vessel 18 further includes internal supports 42, 44, 46, and 48, with apertures 50A, 50B, 50C, and 50D, respectively. Semicylindrical portions 38A, 38B, 38C, 38D, and 38E include curved external walls 52A, 52B, 52C, 52D, and 52E, inner surfaces 54A, 54B, 54C, 54D, and 54E, and outer surfaces 56A, 56B, 56C, 56D, and 56E, respectively. Also shown in FIG. 3 are first intersection locations 58A, 58B, 58C, and 58D and second intersection locations 60A, 60B, 60C, and 60D.

High-pressure fluid vessel 18 includes bottom compartment 24 at a base, intermediate compartments 26, 28, and 30, and top compartment 32 at a top. Capsules 33A, 33B, 33C, 33D, and 33E are arcuate shaped body portions of bottom compartment 24, intermediate compartments 26, 28, and 30, and top compartment 32, respectively. Bottom compartment 24 includes capsule 33A with first domed end 34A opposite of second domed end 36A and semicylindrical portion 38A extending there between. Cavity 40A is formed in bottom compartment 24. Intermediate compartment 26 includes capsule 33B with first domed end 34B opposite of second domed end 36B and semicylindrical portion 38C extending there between. Cavity 40B is formed in intermediate compartment 26. Intermediate compartment 28 includes capsule 33C with first domed end 34C opposite of second domed end 36C and semicylindrical portion 38C extending there between. Cavity 40C is formed in intermediate compartment 28. Intermediate compartment 30 includes capsule 33D with first domed end 34D opposite of second domed end 36D and semicylindrical portion 38D extending there between. Cavity 40D is formed in intermediate compartment 30. Top compartment 32 includes capsule 33E with first domed end 34E opposite of second domed end 36E and semicylindrical portion 38E extending there between. Cavity 40E is formed in top compartment 32.

High-pressure fluid vessel 18 further includes internal supports 42, 44, 46, and 48. Internal support 42 is positioned between bottom compartment 24 and intermediate compartment 26, and aperture 50A extends through internal support 42. Internal support 44 is positioned between intermediate compartment 26 and intermediate compartment 28, and aperture 50B extends through internal support 44. Internal support 46 is positioned between intermediate compartment 28 and intermediate compartment 30, and aperture 50C extends through internal support 46. Internal support 48 is positioned between intermediate compartment 30 and top compartment 32, and aperture 50D extends through internal support 48.

High-pressure fluid vessel 18 will include a port to fill high-pressure fluid vessel 18. The port is preferably positioned in top compartment 32, but can be positioned in any of bottom compartment 24, intermediate compartments 26, 28, 30, and top compartment 32. Water can be put into and released from high-pressure fluid vessel 18 through the port. The water in high-pressure fluid vessel 18 will move between bottom compartment 24, intermediate compartments 26, 28, 30, and top compartment 32 by flowing through apertures 50A, 50B, 50C, and 50D. Apertures 50A, 50B, 50C, and 50D can be any size and shape and there can be multiple apertures 50A, 50B, 50C, and 50D in internal supports 42, 44, 46, and 48 in alternate embodiments.

High-pressure fluid vessel 18 is designed to conform to a space on aircraft 10 (see FIG. 1B). Semicylindrical portions 38A, 38B, 38C, 38D, and 38E of bottom compartment 24, intermediate compartments 26, 28, and 30, and top compartment 32, respectively, are curved to help high-pressure fluid vessel 18 conform to the space on aircraft 10 and to reduce stresses in semicylindrical portions 38A, 38B, 38C, 38D, and 38E.

Semicylindrical portion 38A of bottom compartment 24 includes curved external wall 52A. Curved external wall 52A includes concave inner surface 54A and convex outer surface 56A. Semicylindrical portion 38B of intermediate compartment 26 includes curved external wall 52B. Curved external wall 52B further includes concave inner surface 54B and convex outer surface 56B. Semicylindrical portion 38C of intermediate compartment 28 includes curved external wall 52C. Curved external wall 52C includes concave inner surface 54C and convex outer surface 56C. Semicylindrical portion 38D of intermediate compartment 30 includes curved external wall 52D. Curved external wall 52D further includes concave inner surface 54D and convex outer surface 56D. Semicylindrical portion 38E of top compartment 32 includes curved external wall 52E. Curved external wall 52E includes concave inner surface 54E and convex outer surface 56E.

High-pressure fluid vessel 18 includes a flat side portion and a curved side portion. The flat side portion is the side in which a tangent line can be drawn from curved external wall 52A to curved external wall 52E and approximately only contact curved external walls 52B, 52C, and 52D at a single tangent point of each; the right side of high-pressure fluid vessel 18 as oriented in FIG. 3. The curved side portion is the side opposite the flat side portion; the left side of high-pressure fluid vessel 18 as oriented in FIG. 3.

Curved external walls 52A, 52B, 52C, 52D, and 52E abut one another at first intersection locations 58A, 58B, 58C, and 58D and second intersection locations 60A, 60B, 60C, and 60D, respectfully. Bottom compartment 24 is connected to intermediate compartment 26 at first intersection location 58A and second intersection location 60A. Intermediate compartment 26 is connected to intermediate compartment 28 at first intersection location 58B and second intersection location 60B. Intermediate compartment 28 is connected to intermediate compartment 30 at first intersection location 58C and second intersection location 60C. Intermediate compartment 30 is connected to top compartment 32 at first intersection location 58D and second intersection location 60D.

Located on the flat side portion of high-pressure fluid vessel 18 are first intersection locations 58A, 58B, 58C, and 58D. The intersection of curved external wall 52A and curved external wall 52B defines first intersection location 58A. The intersection of curved external wall 52B and curved external wall 52C defines first intersection location 58B. The intersection of curved external wall 52C and curved external wall 52D defines first intersection location 58C. The intersection of curved external wall 52D and curved external wall 52E defines first intersection location 58D.

Located on the curved side portion of high-pressure fluid vessel 18 are second intersection locations 60A, 60B, 60C, and 60D. The intersection of curved external wall 52A and curved external wall 52B defines second intersection location 60A. The intersection of curved external wall 52B and curved external wall 52C defines second intersection location 60B. The intersection of curved external wall 52C and curved external wall 52D defines second intersection location 60C. The intersection of curved external wall 52D and curved external wall 52E defines second intersection location 60D.

According to the present disclosure, high-pressure fluid vessel 18 must include at least two compartments connected at a first intersection location and a second intersection location. High-pressure fluid vessel 18, in its smallest form, includes bottom compartment 24 and top compartment 32 connected at a first intersection location and a second intersection location. With that said, high-pressure fluid vessel 18 is not limited to a maximum number of compartments and intersection locations; high-pressure fluid vessel 18 can include as many compartments and intersection locations as necessary to conform to an irregular shape or space. The high-pressure fluid vessel described in the preceding paragraphs is a representation of a single embodiment and not meant to limit the disclosure to this particular embodiment.

As shown in FIG. 1B and discussed above, high-pressure fluid vessel 18 curves to conform to external fuselage structure 20. The curvature described is achieved by bottom compartment 24, intermediate compartments 26, 28, and 30, and top compartment 32 having different volumes and radii. Bottom compartment 24 has the largest volume and radius, intermediate compartment 26 has a volume and radius that is smaller than bottom compartment 24, intermediate compartment 28 has a volume and radius that is smaller than intermediate compartment 26, intermediate compartment 30 has a volume and radius that is smaller than intermediate compartment 28, and top compartment 32 has the smallest volume and radius. The radii of first domed ends 34A, 34B, 34C, 34D, and 34E, second domed ends 36A, 36B, 36C, 36D, and 36E, and semicylindrical portions 38A, 38B, 38C, 38D, and 38E, respectively, are preferably the same for each of capsule 33A, 33B, 33C, 33D, and 33E. The curvature of high-pressure fluid vessel 18 is achieved by curved external walls 52A, 52B, 52C, 52D, and 52E having different volumes and radii while maintaining the flat side portion of high-pressure fluid vessel 18. With the flat side portion being held constant and the compartments volume and radii being different, the curved side portion is formed. The curvature of the curved side portion can be varied by modifying the volume and radii of each compartment. In the embodiment shown, high-pressure fluid vessel 18 includes five compartments, each of different volumes and radii. In all embodiments of high-pressure fluid vessel 18, at least two of the compartments must be of different volumes and radii.

High-pressure fluid vessel 18 further includes internal supports 42, 44, 46, and 48 to prevent bottom compartment 24, intermediate compartments 26, 28, 30, and top compartment 32 from deforming under internal pressure. Internal supports 42, 44, 46, and 48 include apertures 50A, 50B, 50C, and 50D, respectively.

Internal support 42 extends from first intersection location 58A to second intersection location 60A. Internal support 44 extends from first intersection location 58B to second intersection location 60B. Internal support 46 extends from first intersection location 58C to second intersection location 60C. Internal support 48 extends from first intersection location 58D to second intersection location 60D.

High-pressure fluid vessel 18 would deform under internal pressure without internal supports 42, 44, 46, and 48. Internal supports 42, 44, 46, and 48 provide structural support to curved external walls 52A, 52B, 52C, 52D, and 52E. Further, internal supports 42, 44, 46, and 48, are strategically placed to evenly distribute the stresses in curved external walls 52A, 52B, 52C, 52D, and 52E. This results in a high-pressure vessel that is high strength and structurally efficient.

Figure 4:
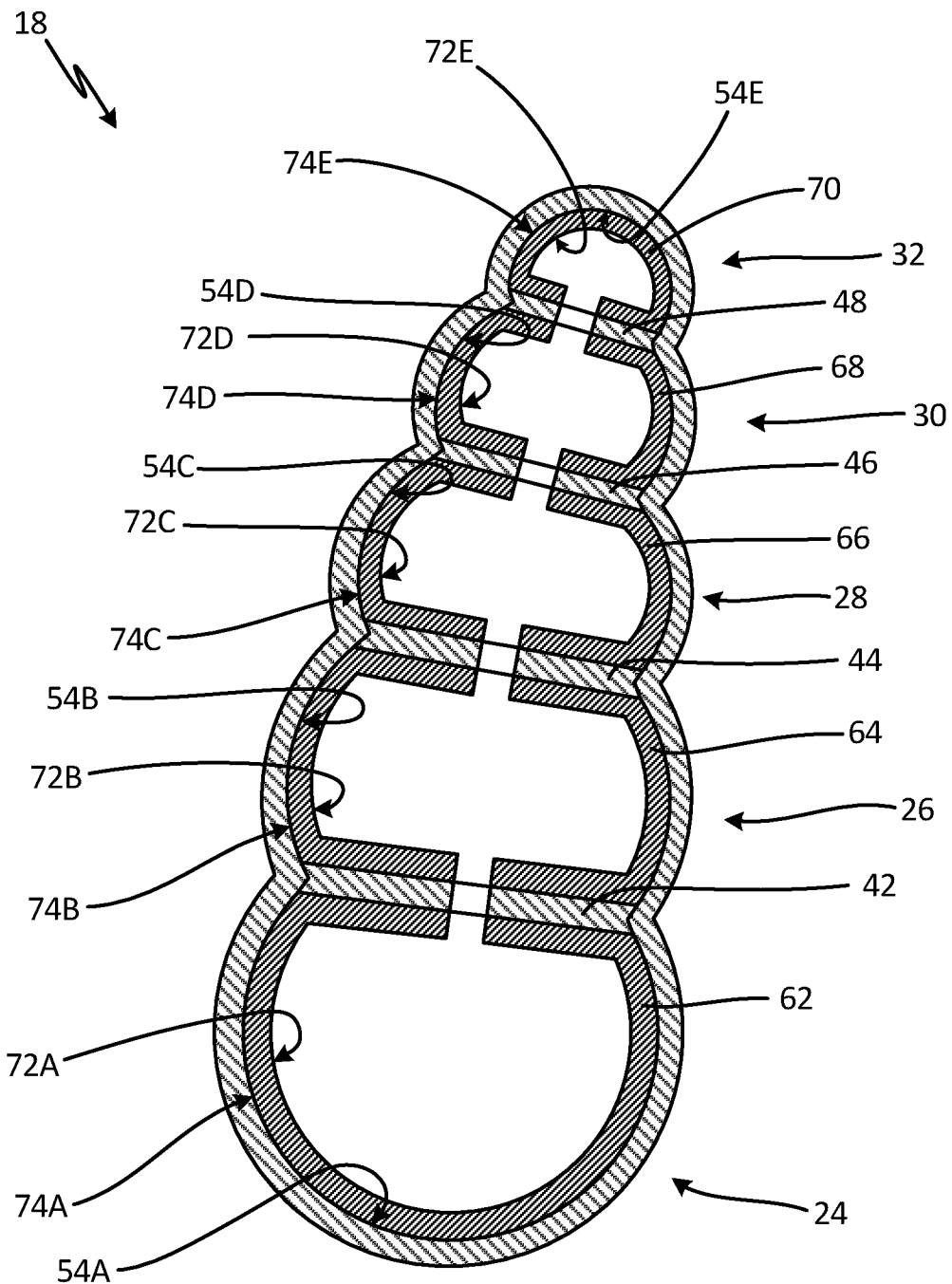
FIG. 4 is a side cross-sectional view of the high-pressure fluid vessel of FIG. 2A, showing an internal liner.

FIG. 4 is a side cross-sectional view of high-pressure vessel 18. As discussed earlier, high-pressure fluid vessel 18 includes bottom compartment 24, intermediate compartments 26, 28, and 30, and top compartment 32, and internal supports 42, 44, 46, and 48. Bottom compartment 24, intermediate compartments 26, 28, and 30, and top compartment 32 include inner surfaces 54A, 54B, 54C, 54D and 54E, respectively. In the embodiment shown, high-pressure fluid vessel 18 further includes bottom liner 62, intermediate liners 64, 66, and 68, and top liner 70. Bottom liner 62, intermediate liners 64, 66, and 68, and top liner 70 include inner surfaces 72A, 72B, 72C, 72D, and 72E and outer surface 74A, 74B, 74C, 74D, and 74E, respectively.

High-pressure fluid vessel 18 includes bottom compartment 24, intermediate compartments 26, 28, and 30, and top compartment 32. Internal supports 42, 44, 46, and 48 extend between bottom compartment 24, intermediate compartments 26, 28, and 30, and top compartment 32. Bottom compartment 24, intermediate compartments 26, 28, and 30, and top compartment 32 have inner surfaces 54A, 54B, 54C, 54D and 54E, respectively. High-pressure fluid vessel 18 further includes bottom liner 62, intermediate liners 64, 66, and 68, and top liner 70. Bottom liner 62 includes inner surface 72A and outer surface 74A. Intermediate liner 64 includes inner surface 72B and outer surface 74B. Intermediate liner 66 includes inner surface 72C and outer surface 74C. Intermediate liner 68 includes inner surface 72D and outer surface 74D. Top liner 70 includes inner surface 72E and outer surface 74E.

Outer surface 74A of bottom liner 62 is configured to abut inner surface 54A of bottom compartment 24 and internal support 42. Outer surface 74B of intermediate liner 64 is configured to abut inner surface 54B of intermediate compartment 26, internal support 42, and internal support 44. Outer surface 74C of intermediate liner 66 is configured to abut inner surface 54C of intermediate compartment 28, internal support 44, and internal support 46. Outer surface 74D of intermediate liner 68 is configured to abut inner surface 54D of intermediate compartment 30, internal support 46, and internal support 48. Outer surface 74E of top liner 70 is configured to abut inner surface 54E of top compartment 32, and internal support 48.

According to one embodiment, bottom liner 62, intermediate liners 64, 66, and 68, and top liner 70 are included within high-pressure fluid vessel 18 to help seal and prevent fluid leakage from high-pressure fluid vessel 18. According to another embodiment, bottom liner 62, intermediate liners 64, 66, and 68, and top liner 70 are not included within high-pressure fluid vessel 18 because bottom compartment 24, intermediate compartments 26, 28, and 30, and top compartment 32 are sufficiently connected and sealed in which fluid leakage is not a concern.

Figure 5:
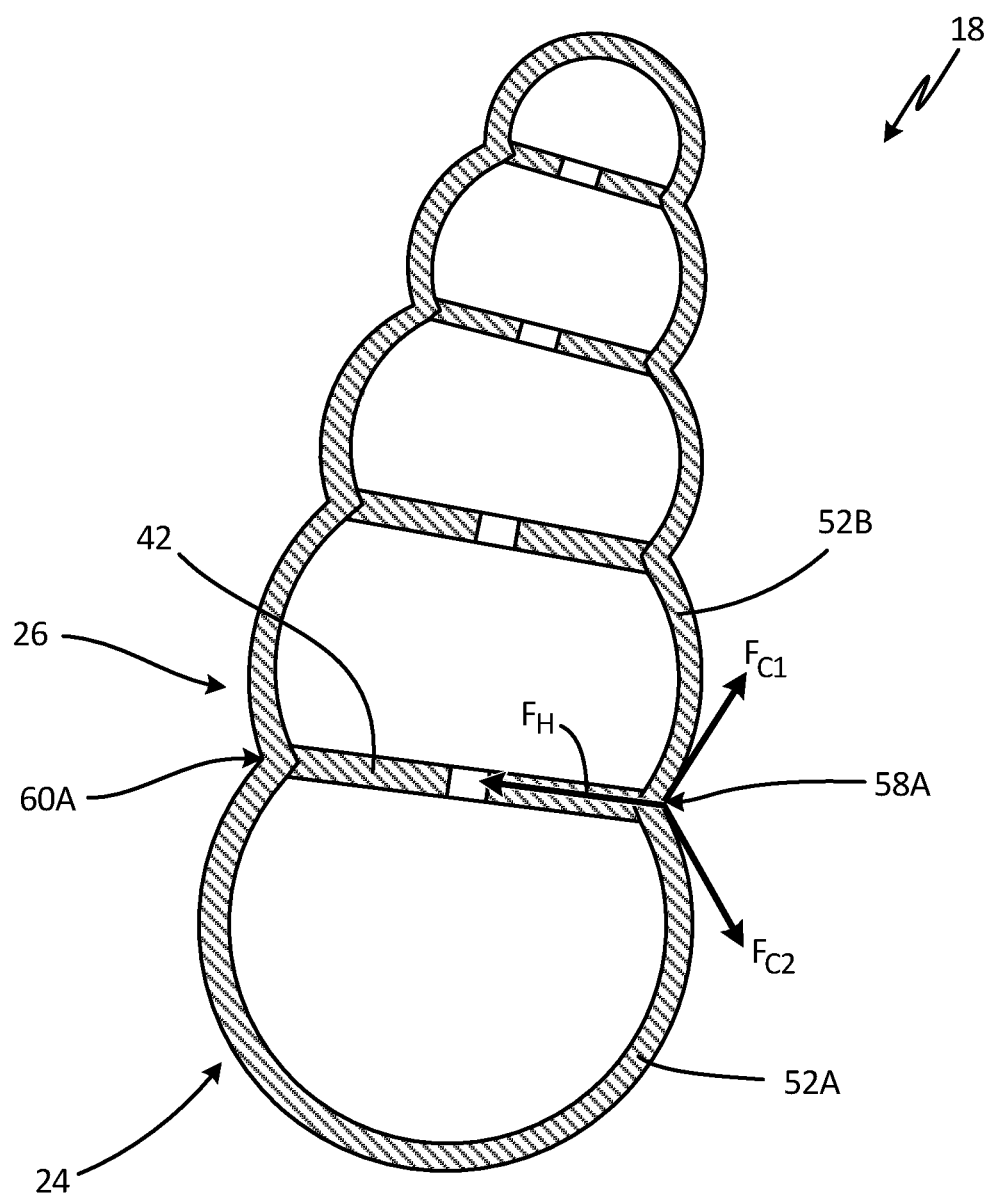
FIG. 5 is a side cross-sectional view of the high-pressure fluid vessel of FIG. 2A, showing the design method and summation of forces.

FIG. 5 is a side cross-sectional view of high-pressure fluid vessel 18, showing the tank design method and summation of forces. FIG. 5 shows bottom compartment 24, intermediate compartment 26, internal support 42, curved external walls 52A and 52B, first intersection location 58A, and second intersection location 60A. FIG. 5 further includes forces $F_h$, $F_{c1}$, and $F_{c2}$, which represent the forces present at first intersection location 58A.

High-pressure fluid vessel 18 includes bottom compartment 24 that is positioned below and attached to intermediate compartment 26 with internal support 42 extending between bottom compartment 24 and intermediate compartment 26. Bottom compartment 24 has curved external wall 52A and intermediate compartment 26 has curved external wall 52B.

First intersection location 58A is the location in which curved external wall 52A of bottom compartment 24 intersects with curved external wall 52B of intermediate compartment 26 and with internal support 42. An important design criterion of high-pressure vessel 18 is that the summation of force at each and every intersection location (including first intersection locations 58A, 58B, 58C, and 58D and second intersection locations 60A, 60B, 60C, and 60D as shown in FIG. 3) of high-pressure fluid vessel 18 must be zero and the directions of the forces do not change significantly during tank pressurization. The force diagram of FIG. 5 represents a simplified version of the forces that are present at first intersection location 58A. In order for high-pressure fluid vessel 18 to maintain its shape under internal pressure, forces $F_h$, $F_{c1}$, and $F_{c2}$ must cancel each other out and equal zero. If the summation of force at the intersection locations does not equal zero, high-pressure fluid vessel 18 will deform and significantly deviate from its initial designed shape under internal pressure.

Although high-pressure vessel 18 has been described with reference to specific embodiments and applications, high-pressure vessel 18 may vary in size and shape for applications where an irregular shaped pressure vessel is desired. High-pressure vessel 18 has been described as being configured to store potable water, but in alternate embodiments high-pressure vessel 18 may also be used to store any other pressurized fluid. High-pressure vessel 18 may be constructed using metal, composite, or other materials; a composite material being the preferred material due to strength and weight characteristics.

High-pressure vessel 18 provides a verified conformable pressure vessel design method for efficient use of a given irregular space. High-pressure vessel 18 is of a structurally efficient design, which results in a high strength and lightweight high-pressure vessel 18. The design method of high-pressure vessel 18 combined with composite materials would provide the benefit of a high strength, lightweight, and conformable high-pressure vessel 18.

Figure 6:
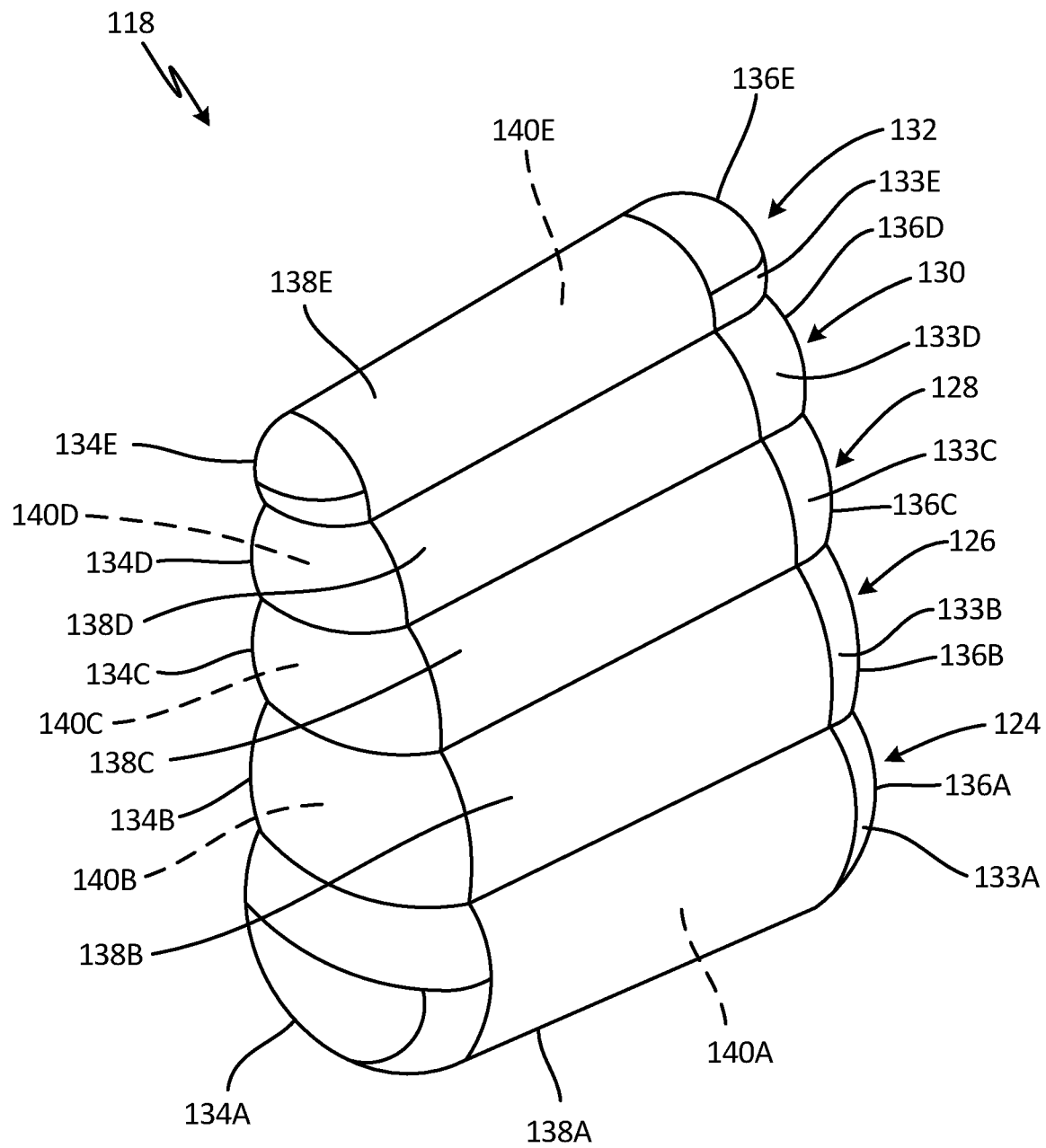
FIG. 6 is a perspective view of a second embodiment of a high-pressure fluid vessel.

FIG. 6 is a perspective view of high-pressure fluid vessel 118. High-pressure fluid vessel 118 includes bottom compartment 124, intermediate compartments 126, 128, and 130, and top compartment 132. Bottom compartment 124 includes capsule 133A with first domed end 134A, second domed end 136A, semicylindrical portion 138A, and cavity 140A. Intermediate compartment 126 includes capsule 133B with first domed end 134B, second domed end 136B, semicylindrical portion 138B, and cavity 140B. Intermediate compartment 128 includes capsule 133C with first domed end 134C, second domed end 136C, semicylindrical portion 138C, and cavity 140C. Intermediate compartment 130 includes capsule 133D with first domed end 134D, second domed end 136D, semicylindrical portion 138D, and cavity 140D. Top compartment 132 includes capsule 133E with first domed end 134E, second domed end 136E, semicylindrical portion 138E, and cavity 140E.

Located at the base of high-pressure fluid vessel 118 is bottom compartment 124, which is located below and connected to intermediate compartment 126. Intermediate compartment 126 is located below and connected to intermediate compartment 128. Intermediate compartment 128 is located below and connected to intermediate compartment 130. Intermediate compartment 130 is located below and connected to top compartment 132. In the embodiment shown, high-pressure fluid vessel 118 has three intermediate compartments 126, 128, and 130. In an alternate embodiment, high pressure fluid vessel 118 can include any number of intermediate compartments or no intermediate compartments.

Capsules 133A, 133B, 133C, 133D, and 133E are convex curved shaped body portions of bottom compartment 124, intermediate compartments 126, 128, and 130, and top compartment 132, respectively. Capsule 133A of bottom compartment 124 includes first domed end 134A, second domed end 136A, and semicylindrical portion 138A extending between and connecting first domed end 134A and second domed end 136A. Cavity 140A is positioned in bottom compartment 124 and is defined by capsule 133A. Capsule 133B of intermediate compartment 126 comprises first domed end 134B, second domed end 136B, and semicylindrical portion 138B extending between and connecting first domed end 134B and second domed end 136B. Cavity 140B is positioned in intermediate compartment 126 and is defined by capsule 133B. Capsule 133C of intermediate compartment 128 includes first domed end 134C, second domed end 136C, and semicylindrical portion 138C extending between and connecting first domed end 134C and second domed end 136C. Cavity 140C is positioned in intermediate compartment 128 and is defined by capsule 133C. Capsule 133D of intermediate compartment 130 includes first domed end 134D, second domed end 136D, and semicylindrical portion 138D extending between and connecting first domed end 134D and second domed end 136D. Cavity 140D is positioned in intermediate compartment 130 and is defined by capsule 133D. Capsule 133E of top compartment 132 includes first domed end 134E, second domed end 136E, and semicylindrical portion 138E extending between and connecting first domed end 134E and second domed end 136E. Cavity 140E is positioned in top compartment 132 and is defined by capsule 133E.

High-pressure fluid vessel 118 is a second embodiment of tank 18 as shown in FIGS. 1A-5. High-pressure fluid vessel 118 can be positioned between external fuselage structure 20 and internal aircraft structure 22, as shown in FIG. 1B. High-pressure fluid vessel 118 has the same properties of high-pressure fluid vessel 18 shown in FIGS. 1A-5, but the shape of the compartments is different. First domed ends 134A, 134B, 134C, 134D, and 134E and second domed ends 136A, 136B, 136C, 136D, and 136E are semiellipsoidal shaped or torispherical shaped. Semicylindrical portions 138A, 138B, 138C, 138D, and 138E are elliptic cylindrical shaped where a cross-section of the semicylindrical portions 138A, 138B, 138C, 138D, and 138E are ellipse shaped. Having semiellipsoidal shaped or torispherical shaped first domed ends 134A, 134B, 134C, 134D, and 134E and second domed ends 136A, 136B, 136C, 136D, and 136E allows high-pressure fluid vessel 118 to be wider, allowing high-pressure fluid vessel 118 to be designed to fit into any space on an aircraft.

Figure 7:
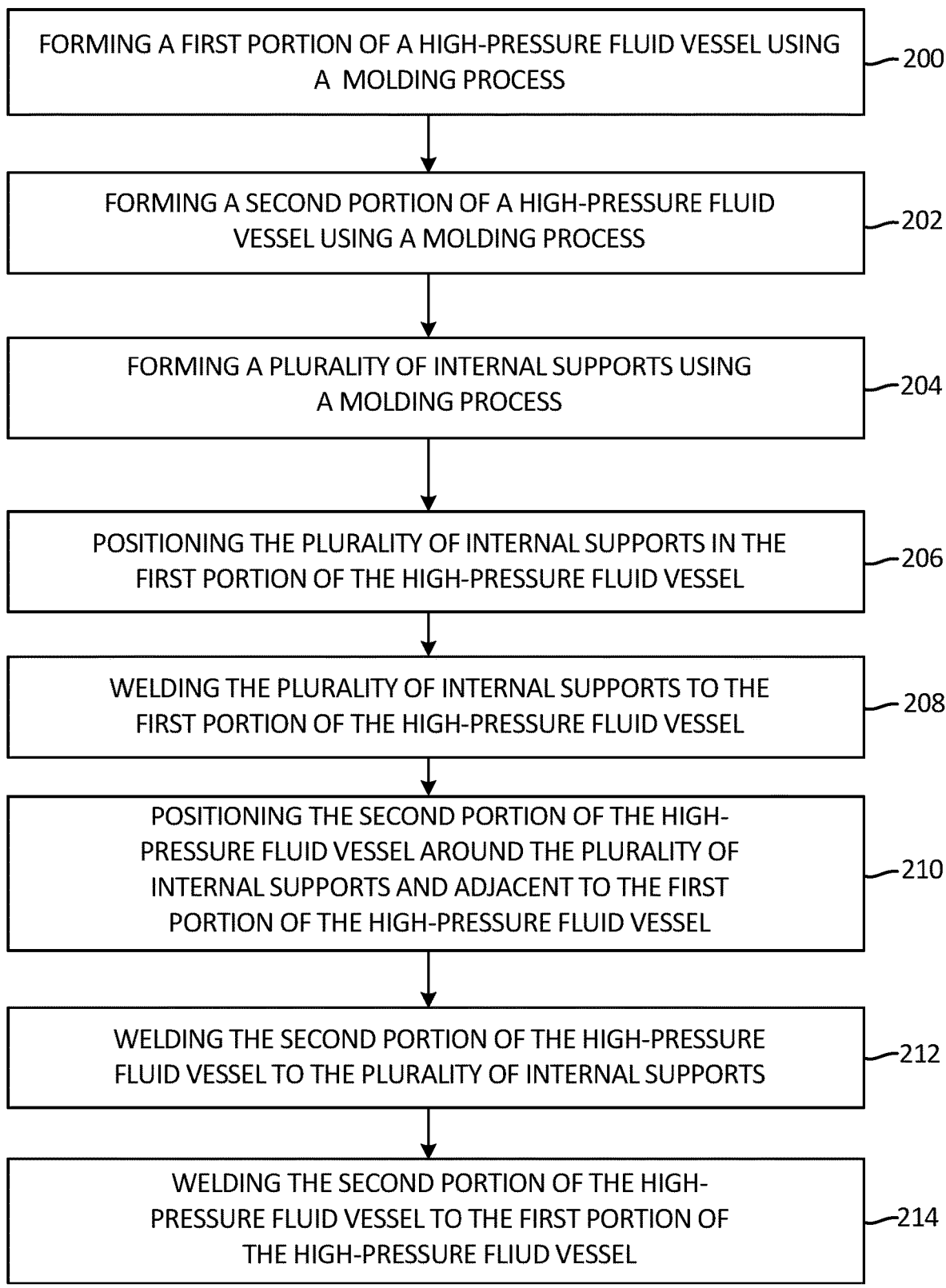
FIG. 7 is a flow chart of a first method for manufacturing a high-pressure fluid vessel.

FIG. 7 is a flow chart of a first method for manufacturing a high-pressure fluid vessel. FIG. 7 shows steps 200-214. Steps 200-214 can be used to manufacture high-pressure fluid vessel 18 shown in FIGS. 1A-5, high-pressure fluid vessel 118 shown in FIG. 6, or any other high-pressure fluid vessel. The following discussion will focus on high-pressure fluid vessel 18, but it is understood that this process can be used to manufacture any other suitable tank.

Step 200 includes forming a first portion of a high-pressure fluid vessel using a molding process. Step 202 includes forming a second portion of the high-pressure fluid vessel using a molding process. Step 204 includes forming a plurality of internal supports using a molding process. The molding process can include injection molding, compression molding, or any other suitable molding process. Steps 200, 202, and 204 can be performed in any order. The high-pressure fluid vessel can have the shape and design of high-pressure fluid vessel 18 as shown in FIGS. 1A-5. The plurality of internal supports can include internal supports 42, 44, 46, and 48 as shown in FIGS. 2B-5.

The first portion of high-pressure fluid vessel 18 can include a first half of capsules 33A, 33B, 33C, 33D, and 33E of bottom compartment 24, intermediate compartments 26, 28, and 30, and top compartment 32 of high-pressure fluid vessel 18, respectively. The first half of capsules 33A, 33B, 33C, 33D, and 33E includes first domed ends 34A, 34B, 34C, 34D, and 34E and half of semicylindrical portions 38A, 38B, 38C, 38D, and 38E. The second portion of high-pressure fluid vessel 18 can include a second half of capsules 33A, 33B, 33C, 33D, and 33E of bottom compartment 24, intermediate compartments 26, 28, and 30, and top compartment 32 of high-pressure fluid vessel 18, respectively. The second half of capsules 33A, 33B, 33C, 33D, and 33E includes second domed ends 34A, 34B, 34C, 34D, and 34E and the other half of semicylindrical portions 38A, 38B, 38C, 38D, and 38E. In alternate embodiments, the first portion of high-pressure fluid vessel 18 and the second portion of high-pressure fluid vessel 18 can be any portions of high-pressure fluid vessel 18 that together form high-pressure fluid vessel 18. The first portion of the high-pressure fluid vessel 18, the second portion of the high-pressure fluid vessel 18, and internal supports 42, 44, 46, and 48 can all be manufactured according to standard molding processes, including injection molding or compression molding.

A standard injection molding process includes the following. First a mold for the part is created according to the design of the part and will include a cavity that is shaped according to the design of the part. The mold is positioned in a clamp adjacent to a tip of an injection unit. The mold will include a pathway that connects the cavity of the mold with the tip of the injection unit. Pellets of material will be placed in a hopper to be fed into a barrel of an injection unit. The injection unit can include a screw-type plunger that is used to move the pellets through the barrel of the injection unit towards a tip of the injection unit. The barrel of the injection unit is heated to melt the pellets as they move through the barrel of the injection unit. At the tip of the injection unit, the pellets of material will be completely molten. When enough molten material has accumulated at the tip, the screw-type plunger will ram forward to force the molten material through the tip of the injection unit to fill the cavity of the mold. After the molten material has solidified in the mold, the clamp can be released to separate the mold and allow the part to be removed from the mold.

A standard compression molding process includes the following. First a mold for the part is created according to the design of the part and will include a cavity that is shaped according to the design of the part. The mold is positioned in a hydraulic press. A material is placed over or inserted into the mold. The mold can be preheated prior to the material being placed over or in the mold. The material is then heated to a pliable state. The hydraulic press then compresses the pliable material with a top force or plug member. The pressure applied to the pliable material causes the material to form to the shape of the mold. The pressure is maintained until the material has cured, the pressure is released and the part can be removed from the mold.

The above includes a general description of an injection molding process and a compression molding process. The process can vary from those described above. Each of the first portion of high-pressure fluid vessel 18, the second portion of high-pressure fluid vessel 18, and internal supports 42, 44, 46, and 48 can be formed using any molding process. The first portion of high-pressure fluid vessel 18, the second portion of high-pressure fluid vessel 18, and internal supports 42, 44, 46, and 48 are manufactured out of a fiber reinforced polymer matrix composite.

Step 206 includes positioning the plurality of internal supports in the first portion of the high-pressure fluid vessel. A first end of each of internal supports 42, 44, 46, and 48 are positioned in the first half of high-pressure fluid vessel 18. Internal support 42 is positioned at the intersection of bottom compartment 24 and intermediate compartment 26; internal support 44 is positioned at the intersection of intermediate compartment 26 and intermediate compartment 28; internal support 46 is positioned at the intersection of intermediate compartment 28 and intermediate compartment 30; and internal support 48 is positioned at the intersection of intermediate compartment 30 and top compartment 32.

Step 208 includes welding the plurality of internal supports to the first portion of the high-pressure fluid vessel. Internal supports 42, 44, 46, and 48 can be welded to the first half of high-pressure fluid vessel 18 using friction stir welding, adhesive bonding, ultrasonic welding, or any other suitable welding process. Internal support 42 is welded to the intersection of bottom compartment 24 and intermediate compartment 26; internal support 44 is welded to the intersection of intermediate compartment 26 and intermediate compartment 28; internal support 46 is welded to the intersection of intermediate compartment 28 and intermediate compartment 30; and internal support 48 is welded to the intersection of intermediate compartment 30 and top compartment 32.

Step 210 includes positioning the second portion of the high-pressure fluid vessel around the plurality of internal supports and adjacent to the first portion of the high-pressure fluid vessel. The second half of high-pressure fluid vessel 18 is positioned over a second end of each of internal supports 42, 44, 46, and 48. Internal support 42 is positioned at the intersection of bottom compartment 24 and intermediate compartment 26; internal support 44 is positioned at the intersection of intermediate compartment 26 and intermediate compartment 28; internal support 46 is positioned at the intersection of intermediate compartment 28 and intermediate compartment 30; and internal support 48 is positioned at the intersection of intermediate compartment 30 and top compartment 32. An edge of the second half of high-pressure fluid vessel 18 is also positioned adjacent to an edge of the first half of high-pressure fluid vessel 18.

Step 212 includes welding the second portion of the high-pressure fluid vessel to the plurality of internal supports. Internal supports 42, 44, 46, and 48 can be welded to the first half of high-pressure fluid vessel 18 using friction stir welding, adhesive bonding, ultrasonic welding, or any other suitable welding process. Internal support 42 is welded to the intersection of bottom compartment 24 and intermediate compartment 26; internal support 44 is welded to the intersection of intermediate compartment 26 and intermediate compartment 28; internal support 46 is welded to the intersection of intermediate compartment 28 and intermediate compartment 30; and internal support 48 is welded to the intersection of intermediate compartment 30 and top compartment 32.

Step 214 includes welding the second portion of the high-pressure fluid vessel to the first portion of the high-pressure fluid vessel. The second half of high-pressure fluid vessel 18 can be welded to the first half of high-pressure fluid vessel 18 using friction stir welding, adhesive bonding, ultrasonic welding, or any other suitable welding process. The edge of the second half of high-pressure fluid vessel 18 is welded to the edge of the first half of high-pressure fluid vessel 18.

Manufacturing high-pressure fluid vessel 18 using steps 200-214 as described will create a leak-tight vessel that is capable of storing a fluid. High-pressure fluid vessel 18 can be used on an aircraft. High-pressure fluid vessel 18 is made out of a fiber reinforced polymer matrix composite, which will result in high-pressure fluid vessel 18 being lightweight. Further, the fiber reinforced polymer matrix composite can be potable water safe, eliminating the need for using a liner in high-pressure fluid vessel 18.

Figure 8:
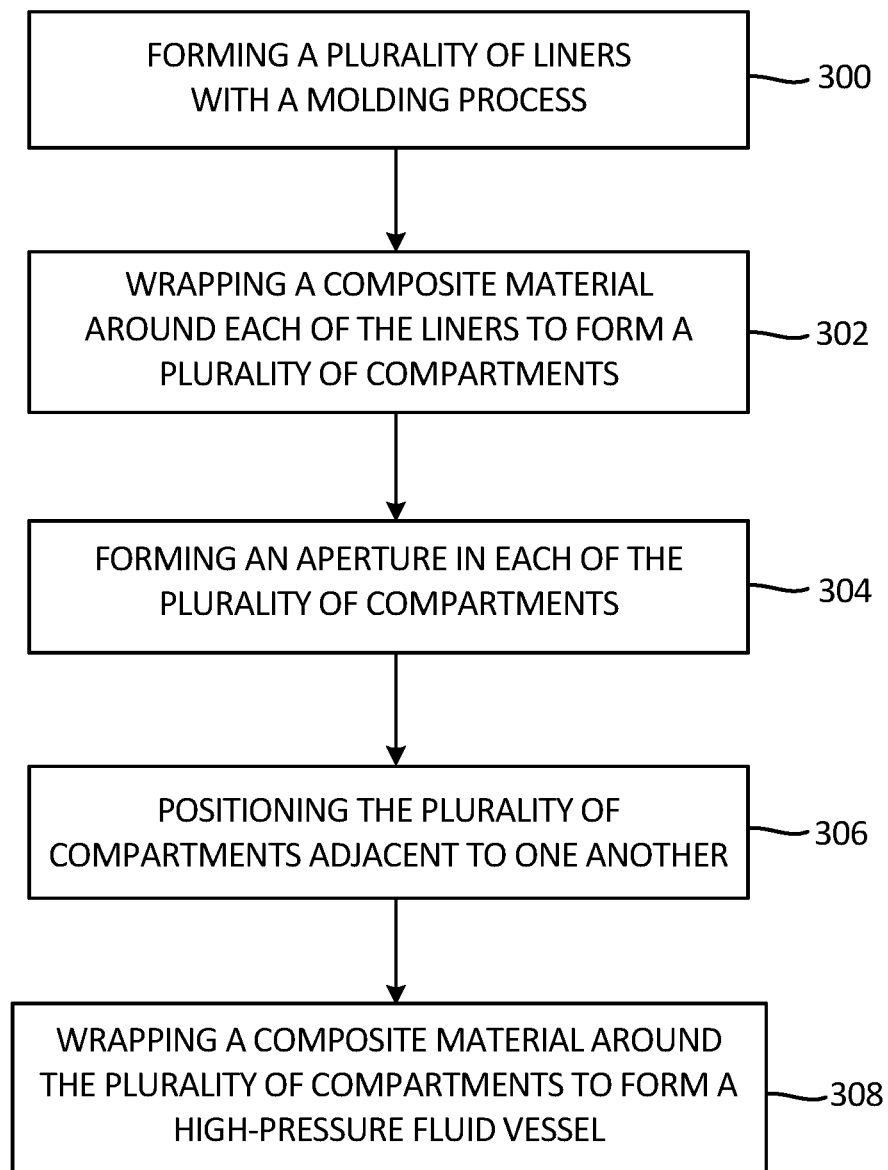
FIG. 8 is a flow chart of a second method for manufacturing a high-pressure fluid vessel.

FIG. 8 is a flow chart of a second method for manufacturing high-pressure fluid vessel 18. FIG. 8 includes steps 300-312. Steps 300-312 can be used to manufacture high-pressure fluid vessel 18 shown in FIGS. 1A-5, high-pressure fluid vessel 118 shown in FIG. 6, or any other high-pressure fluid vessel. The following discussion will focus on high-pressure fluid vessel 18, but it is understood that this process can be used to manufacture any other suitable tank.

Step 300 includes forming a plurality of liners with a molding process. The molding process can include blow molding, rotational molding, or injection molding. The plurality of liners can include bottom liner 62, intermediate liners 64, 66, 68, and top liner 70 as shown in FIG. 4. Bottom liner 62, intermediate liners 64, 66, 68, and top liner 70 can be manufactured according to standard molding process, such as blow molding, rotational molding, or injection molding.

A standard blow molding process includes the following. First a mold for the part is created according to the design of the part and will include a cavity that is shaped according to the design of the part. The mold is positioned in a clamp adjacent to a tip of a blow molding apparatus. The mold will include a pathway that connects the cavity of the mold with the tip of the blow molding apparatus. There are three general blow molding processes: extrusion blow molding, injection blow molding, and injection stretch blow molding.

Extrusion blow molding includes melting a material and forming it into a parison (or hollow tube). The parison is then positioned in the mold and air is blown into the parison to inflate in the mold. The inflated material then will form to the cavity in the mold. Both injection blow molding and injection stretch blow molding include injection molding a preform with a standard injection molding process and then positioning the preform in a blow molding apparatus to be inflated and cooled.

A standard rotational molding process includes the following. First a mold for the part is created according to the design of the part and will include a cavity that is shaped according to the design of the part. A material is placed in the mold. Then mold can be heated prior the material being placed in the mold. The mold is then slowly rotated and heated as needed to soften the material in the mold. The softened material will then disperse and stick to the walls of the mold. The material and the mold are cooled while the mold continues to rotate to prevent the material from sagging or deforming during the cooling process. Once the material has cooled, the mold can be opened and the part can be removed.

A standard injection molding process includes the following. First a mold for the part is created according to the design of the part and will include a cavity that is shaped according to the design of the part. The mold is positioned in a clamp adjacent to a tip of an injection unit. The mold will include a pathway that connects the cavity of the mold with the tip of the injection unit. Pellets of material will be placed in a hopper to be fed into a barrel of an injection unit. The injection unit can include a screw-type plunger that is used to move the pellets through the barrel of the injection unit towards a tip of the injection unit. The barrel of the injection unit is heated to melt the pellets as they move through the barrel of the injection unit. At the tip of the injection unit, the pellets of material will be completely molten. When enough molten material has accumulated at the tip, the screw-type plunger will ram forward to force the molten material through the tip of the injection unit to fill the cavity of the mold. After the molten material has solidified in the mold, the clamp can be released to separate the mold and allow the part to be removed from the mold.

The above includes a general description of blow molding processes, a rotational molding process, and an injection molding process. The processes can vary from those described above. Each of bottom liner 62, intermediate liners 64, 66, 68, and top liner 70 can be formed using any molding process.

Bottom liner 62 will include a capsule portion to form bottom compartment 24 and a flat portion that will form part of internal support 42. Intermediate liner 64 will include a capsule portion to form intermediate compartment 26, a flat portion that will form part of internal support 42, and a flat portion that will form part of internal support 44. Intermediate liner 66 will include a capsule portion to form intermediate compartment 28, a flat portion that will form part of internal support 44, and a flat portion that will form part of internal support 46. Intermediate liner 68 will include a capsule portion to form intermediate compartment 30, a flat portion that will form part of internal support 46, and a flat portion that will form part of internal support 48. Top liner 70 will include a capsule portion to form to compartment 32 and a flat portion that will form part of internal support 48. The capsule portion of each of bottom liner 62, intermediate liners 64, 66, 68, and top liner 70 will include a first domed end, a second domed end, and a semicylindrical portion extending between the first domed end and the second domed end.

Step 302 includes wrapping a composite material around each of the liners to form a plurality of compartments. The plurality of compartments can includes bottom compartment 24, intermediate compartments 26, 28, and 30, and top compartment 32 as shown in FIGS. 2A-5. Bottom liner 62, intermediate liners 64, 66, 68, and top liner 70 can be wrapped with a composite material to form bottom compartment 24, intermediate compartments 26, 28, and 30, and top compartment 32, respectively.

Bottom liner 62, intermediate liners 64, 66, 68, and top liner 70 can be wrapped with a continuous fiber composite or a hybrid of continuous and discontinuous fiber composites. Fibers have greater lengths than diameters and the length-to-diameter ratio is known as the aspect ratio. Continuous fiber composites have fibers with long aspect ratios and discontinuous fiber composites have fibers with short aspect ratios. Continuous fiber composites also tend to have a preferred orientation, while discontinuous fiber composites have a random orientation. Fibers in composite materials provide structural reinforcement for the composite material. The composite material used to wrap bottom liner 62, intermediate liners 64, 66, 68, and top liner 70 can be fiber tows, a fabric, or fiber tapes that include either continuous fibers or a hybrid of continuous and discontinuous fibers in a composite material. The fiber can be carbon fiber, glass fiber, aramid fiber, or any other suitable fibers. The composite material can be a thermoset matrix material or any other suitable composite material.

Bottom liner 62, intermediate liners 64, 66, 68, and top liner 70 will define the shape of bottom compartment 24, intermediate compartments 26, 28, and 30, and top compartment 32, respectively. As such, bottom compartment 24 will include capsule 33A and a flat portion that will form part of internal support 42. Capsule 33A will include first domed end 34A, second domed end 36A, and semicylindrical portion 38A. Intermediate compartment 26 will include capsule 33B, a flat portion that will form part of internal support 42, and a flat portion that will form part of internal support 44. Capsule 33B will include first domed end 34B, second domed end 36B, and semicylindrical portion 38B. Intermediate compartment 28 will include capsule 33C, a flat portion that will form part of internal support 44, and a flat portion that will form part of internal support 46. Capsule 33C will include first domed end 34C, second domed end 36C, and semicylindrical portion 38C. Intermediate compartment 30 will include capsule 33D, a flat portion that will form part of internal support 46, and a flat portion that will form part of internal support 48. Capsule 33D will include first domed end 34D, second domed end 36D, and semicylindrical portion 38D. Top compartment 32 will include capsule 33E and a flat portion that will form part of internal support 48. Capsule 33E will include first domed end 34E, second domed end 36E, and semicylindrical portion 38E.

Step 304 includes forming an aperture in each of the plurality of compartments. The apertures can include apertures 50A, 50B, 50C, and 50D, as shown in FIGS. 2B-3. Apertures 50A, 50B, 50C, and 50D are formed in bottom compartment 24, intermediate compartments 26, 28, and 30, and top compartment 32. Apertures 50A, 50B, 50C, and 50D can be formed using any suitable process.

Apertures 50A, 50B, 50C, and 50D are each formed in two compartments. Aperture 50A is formed in the flat portion of bottom compartment 24 and one of the flat portions of intermediate compartment 26. Aperture 50B is formed in one of the flat portions of intermediate compartment 26 and one of the flat portions of intermediate compartment 28. Aperture 50C is formed in one of the flat portion of intermediate compartment 28 and one of the flat portions of intermediate compartment 30. Aperture 50D is formed in one of the flat portion of intermediate compartment 30 and the flat portion of intermediate compartment 32.

Step 306 includes positioning the plurality of compartments adjacent to one another. Bottom compartment 24, intermediate compartments 26, 28, and 30, and top compartment 32 are positioned adjacent to one another to form the shape of high-pressure fluid vessel 18. The flat portions of bottom compartment 24, intermediate compartments 26, 28, and 30, and top compartment 32 are positioned adjacent to one another.

The flat portion of bottom compartment 24 is positioned adjacent to one of the flat portions of intermediate compartment 26 to align apertures 50A in each. One of the flat portions of intermediate compartment 26 is positioned adjacent to one of the flat portions of intermediate compartments 28 to align apertures 50B in each. One of the flat portions of intermediate compartment 28 is positioned adjacent to one of the flat portions of intermediate compartments 30 to align apertures 50C in each. One of the flat portions of intermediate compartment 30 is positioned adjacent to the flat portions of top compartments 32 to align apertures 50D in each.

Positioning the bottom compartment 24, intermediate compartments 26, 28, and 30, and top compartment 32 adjacent to one another will form internal supports 42, 44, 46, and 48. Internal supports 42, 44, 46, and 48 will include a first liner layer, two layers of composite material, and a second liner layer. Apertures 50A, 50B, 50C, and 50D will extend through internal supports 42, 44, 46, and 48, respectively.

Step 308 includes wrapping a composite material around the plurality of compartments to form a high-pressure fluid vessel. Bottom compartment 24, intermediate compartments 26, 28, and 30, and top compartment 32 can be wrapped with a composite material to form high-pressure fluid vessel 18.

Bottom compartment 24, intermediate compartments 26, 28, and 30, and top compartment 32 can be wrapped with a continuous fiber composite or a hybrid of continuous and discontinuous fiber composites. Fibers in composite materials provide structural reinforcement for the composite material. The composite material used to wrap bottom compartment 24, intermediate compartments 26, 28, and 30, and top compartment 32 can be fiber tows, a fabric, or fiber tapes that include either continuous fibers or a hybrid of continuous and discontinuous fibers in a composite material. The fiber can be carbon fiber, glass fiber, aramid fiber, or any other suitable fibers. The composite material can be a thermoset matrix material or any other suitable composite material. Wrapping high-pressure fluid vessel 18 will result in walls of capsules 33A, 33B, 33C, 33D, and 33E of high-pressure fluid vessel 18 having a liner and two layers of composite material.

Manufacturing high-pressure fluid vessel 18 using steps 300-308 as described will create a leak-tight vessel that is capable of storing a fluid. High-pressure fluid vessel 18 can be used on an aircraft. High-pressure fluid vessel 18 is made out of a continuous fiber composite or a hybrid of continuous and discontinuous fiber composites, which will result in high-pressure fluid vessel 18 being lightweight.

Discussion of Possible Embodiments

The following are non-exclusive descriptions of possible embodiments of the present invention.

A method of manufacturing a high-pressure fluid vessel includes forming a first portion of a high-pressure fluid vessel with a molding process. The high-pressure fluid vessel includes a stack of capsules. Each capsule includes a first domed end, a second domed end, and a semicylindrical portion extending between and connecting the first domed end to the second domed end. The method further includes forming a second portion of a high-pressure fluid vessel with the molding process. The second portion of the high-pressure fluid vessel is positioned adjacent to the first portion of the high-pressure fluid vessel. The second portion of the high-pressure fluid vessel is welded to the first portion of the high-pressure fluid vessel.

The method of the preceding paragraph can optionally include, additionally and/or alternatively, any one or more of the following features, configurations and/or additional components:

Wherein the first portion of the high-pressure fluid vessel includes a first half of each of the capsules of the high-pressure fluid vessel including the first domed ends and half of the semicylindrical portions, and wherein the second portion of the high-pressure fluid vessel includes a second half of each of the capsules of the high-pressure fluid vessel including the second domed ends and half of the semicylindrical portions.

Wherein the molding process is selected from the group consisting of injection molding, compression molding, and combinations thereof.

Wherein welding the second portion of the high-pressure fluid vessel to the first portion of the high-pressure fluid vessel includes friction stir welding the second portion of the high-pressure fluid vessel to the first portion of the high-pressure fluid vessel.

The method further includes forming a plurality of internal supports with the molding process; positioning the plurality of internal supports in the first portion of the high-pressure fluid vessel; welding the plurality of internal supports to the first portion of the high-pressure fluid vessel; positioning the second portion of the high-pressure fluid vessel around the plurality of internal supports; and welding the plurality of internal supports to the second portion of the high-pressure fluid vessel.

Wherein positioning the plurality of internal supports in the first portion of the high-pressure fluid vessel includes positioning each of the plurality of internal supports between adjacent capsules.

Wherein positioning the second portion of the high-pressure fluid vessel around the plurality of internal supports includes positioning each of the plurality of internal supports between adjacent capsules.

Wherein welding the plurality of internal supports to the first portion of the high-pressure fluid vessel includes friction stir welding the plurality of internal supports to the first portion of the high-pressure fluid vessel.

Wherein welding the plurality of internal supports to the second portion of the high-pressure fluid vessel includes friction stir welding the plurality of internal supports to the second portion of the high-pressure fluid vessel.

A method of manufacturing a high-pressure fluid vessel includes forming a plurality of liners with a molding process. A first composite material is wrapped around each of the liners to form a plurality of compartments. An aperture is formed in each of the plurality of compartments. The plurality of compartments are positioned adjacent to one another. A second composite material is wrapped around the plurality of compartments to form a high-pressure fluid vessel.

The method of the preceding paragraph can optionally include, additionally and/or alternatively, any one or more of the following features, configurations and/or additional components:

Wherein the first composite material and the second composite material are continuous fiber composite materials that include a fiber selected from the group consisting of a carbon fiber, a glass fiber, an aramid fiber, and combinations thereof.

Wherein the first composite material and the second composite material are a hybrid of a continuous and discontinuous fiber composite material that include a fiber selected from the group consisting of a carbon fiber, a glass fiber, an aramid fiber, and combinations thereof.

Wherein the plurality of liners are formed out of a plastic material.

Wherein the molding process is selected from the group consisting of blow molding, rotational molding, injection molding, and combinations thereof.

Wherein the high-pressure fluid vessel further includes a stack of capsules, wherein each capsule includes a first domed end, a second domed end, and a semicylindrical portion extending between and connecting the first domed end to the second domed end.

Wherein forming a plurality of liners includes forming a plurality of liners with a capsule portion and a flat portion.

Wherein wrapping a first composite material around each of the liners to form a plurality of compartments includes forming a plurality of compartments that each have a capsule and a flat portion.

Wherein forming an aperture in each of the plurality of compartments includes forming an aperture in the flat portion of each of the plurality of compartments.

Wherein positioning the plurality of compartments adjacent to one another includes positioning the flat portion of the first capsule adjacent to the flat portion of the second capsule.

The method further includes aligning an aperture in the flat portion of the first capsule with an aperture in the flat portion of the second capsule.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a high-pressure fluid vessel, the method comprising:

forming a first portion of the high-pressure fluid vessel with a molding process, wherein the high-pressure fluid vessel includes a stack of capsules, wherein each capsule includes a first domed end, a second domed end, and a semicylindrical portion extending between and connecting the first domed end to the second domed end;

forming a second portion of the high-pressure fluid vessel with the molding process;

forming a plurality of internal supports with the molding process;

positioning the plurality of internal supports in the first portion of the high-pressure fluid vessel;

welding the plurality of internal supports to the first portion of the high-pressure fluid vessel;

positioning the second portion of the high-pressure fluid vessel adjacent to the first portion of the high-pressure fluid vessel and around the plurality of internal supports; and welding the plurality of internal supports to the second portion of the high-pressure fluid vessel; and welding the second portion of the high-pressure fluid vessel to the first portion of the high-pressure fluid vessel;

wherein positioning the plurality of internal supports in the first portion of the high-pressure fluid vessel includes positioning each of the plurality of internal supports between adjacent capsules.

2. The method of claim 1, wherein the first portion of the high-pressure fluid vessel includes a first half of each of the capsules of the high-pressure fluid vessel including the first domed ends and half of the semicylindrical portions, and wherein the second portion of the high-pressure fluid vessel includes a second half of each of the capsules of the high-pressure fluid vessel including the second domed ends and half of the semicylindrical portions.

3. The method of claim 1, wherein the molding process is selected from the group consisting of injection molding, compression molding, and combinations thereof.

4. The method of claim 1, wherein welding the second portion of the high-pressure fluid vessel to the first portion of the high-pressure fluid vessel includes friction stir welding the second portion of the high-pressure fluid vessel to the first portion of the high-pressure fluid vessel.

5. The method of claim 1, wherein positioning the second portion of the high-pressure fluid vessel around the plurality of internal supports includes positioning each of the plurality of internal supports between adjacent capsules.

6. The method of claim 1, wherein welding the plurality of internal supports to the first portion of the high-pressure fluid vessel includes friction stir welding the plurality of internal supports to the first portion of the high-pressure fluid vessel.

7. The method of claim 1, wherein welding the plurality of internal supports to the second portion of the high-pressure fluid vessel includes friction stir welding the plurality of internal supports to the second portion of the high-pressure fluid vessel.

* * * * *